Patented Oct. 4, 1932

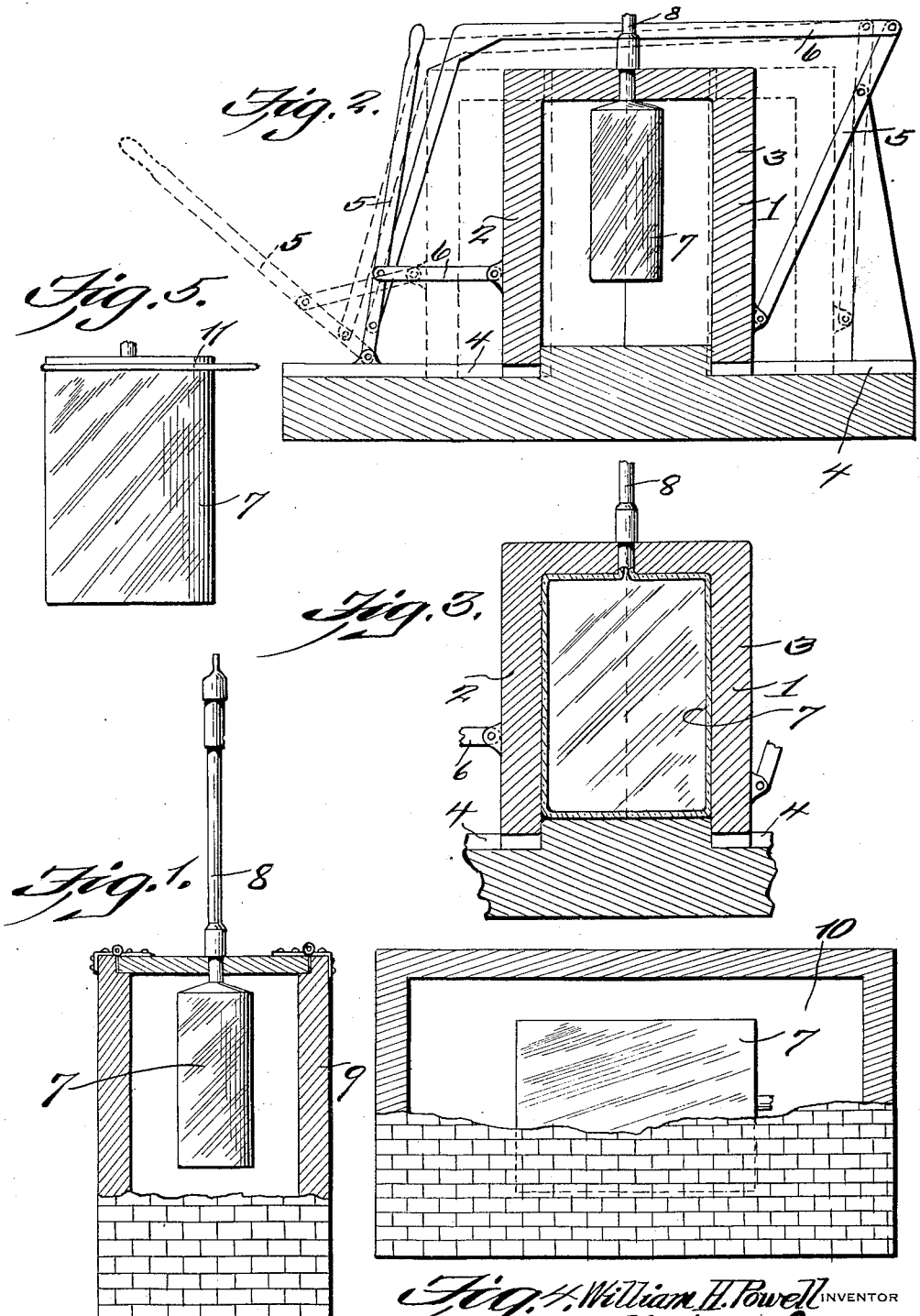

1,881,327

UNITED STATES PATENT OFFICE

WILLIAM H. POWELL, OF MULLICA HILL, NEW JERSEY

APPARATUS AND PROCESS FOR MAKING WINDOW SHEET OR FLAT GLASS

Application filed October 2, 1929. Serial No. 396,787.

The present invention relates to an improved apparatus and process for molding window sheet or flat glass, the purpose being to use a multiple section mold, wherein the sections are slidable toward each other in guides and capable of receiving a glass tube which may be blown toward the flat sides of the mold in order to transform the glass tube to a rectangular shape, so that by substantially cutting off the ends of the body of the tube, and then severing the open ended body at the corners it is possible to produce four flat window glass sheets, such as will permit of a clear vision through the glass.

Another purpose is to provide an apparatus and method, wherein the clear vision through the flat glass sheets may be accomplished, by surfacing the inner face of the mold with a suitable paste well known in the art of molding flat window glass.

In the method of constructing this kind of molded window glass it is possible to use either a metal mold or a wood mold. In the metal mold it is essential to use paste of any well known character, such as used in the molding of window glass. In using a wooden mold it is essential to soak the sides of the wooden mold with clear water. In either instance when the walls of the tubular body are blown against the soaked sides of the wooden mold, or against the coated surface of the metal mold, the window glass sheet may be produced with a highly polished surface, particularly such as will enable clear visions to be had there-through.

It is to be understood that the particulars herein given are in no way limitative, and that while still keeping within the scope of the invention, any desired modification of details and proportions may be made in the construction of the appliance and process according to circumstances.

The invention comprises further features and combination of parts to be hereinafter set forth, shown in the drawing and claimed.

In the drawing:

Figure 1 is a sectional view through a heating furnace, for heating a tubular body having a blow tube temporarily attached.

Figure 2 is a vertical sectional view through a mold constructed in accordance with the invention, showing the mold constructed in two sections, the sections being mounted in guides and provided with means to operate the two sections toward each other, illustrating the blow pipe with a cylindrical glass tube or body depending from the pipe, the glass tube or body assuming a position in the mold.

Figure 3 is a sectional view through the mold with the tubular body blown so that it contacts with the interior of the two sections of the mold, the mold being of rectangular contour.

Figure 4 is a sectional view through a lear or annealing oven 10, where the tubular body may be tempered.

Figure 5 is a view in elevation of the tubular body blown to a rectangular shape so that the opposite ends may be cut by an electric wire 11.

Referring to the drawing 1 identifies a mold which may be any shape and of any size and preferably rectangular. This mold comprises two sections 2 and 3, which are mounted in guides 4, so that the sections can move toward and from each other, there being levers and links 5 and 6 so connected and pivotally mounted on the sections of the mold, as to enable the sections to be moved toward and from each other. When moving toward each other the sections are designed to engage, in order to remain so sufficiently disposed as to permit a hollow cylindrical glass body 7 to be blown against the sides of the mold in order to produce a rectangular tubular body.

However before the tubular body can be blown against the inner face of the mold, the body 7 with the tube 8 attached may be suspended in any suitable manner within a furnace 9, until the glass body is heated to a pliable state.

The tubular body with the blow tube attached is then removed and lowered into the mold after which air under pressure is forced through the blow tube and causes the tubular body to expand against the sides of the mold.

After the tubular body has been enlarged against the inner sides of the mold, the mold is opened, the molded article is then removed, and placed in a lear or annealing oven 10, the purpose being to temper the body of the article. The temper should be sufficient to allow the top and bottom of the article to be cut. The cutting of the top and bottom may be accomplished by an electric wire 11, which will so heat the sides of the body at such points as to cause the top and bottom to crack off even. Obviously the ends of the molded body or article are then open. Subsequently the corners of the body can be cut by a diamond or other glass cutter, and by this method there are produced four glass flat plates of relatively uniform thickness throughout.

Should the body of the mold be made of wood, the sides and ends thereof being previously soaked in clear water, the plates are completed with a high polish, which provides for a clear vision.

Should the mold be made of metal the inner face of the sides and ends of the mold are supplied with paste well known in this art, which will produce a clear highly polished window glass.

The invention having been set forth, what is claimed is:

In a process for molding flat window glass sheets, the steps consisting in subjecting a hollow glass body to furnace heat, suspending said body within a mold whose interior surface consists of a plurality of flat faces, previously applying a solution to the flat faces to give a high polish to the glass when made to conform to the shape of the interior of the mold, thereby giving the glass a clear vision and transparency, expanding the wall of the glass body against the walls of the mold, whereby the wall of the body may take the shape of the walls of the mold, opening the mold and removing the glass body, annealing the glass body, cutting the opposite ends of the glass body, and finally cutting the corners of the reshaped glass body, whereby the side facets of the body may constitute flat window glass sheets.

In testimony whereof he affixes his signature.

WILLIAM H. POWELL.